May 7, 1963 D. J. GIBBONS 3,088,899
NUCLEAR REACTOR BURST CARTRIDGE DETECTION
Filed Sept. 4, 1959 4 Sheets-Sheet 4
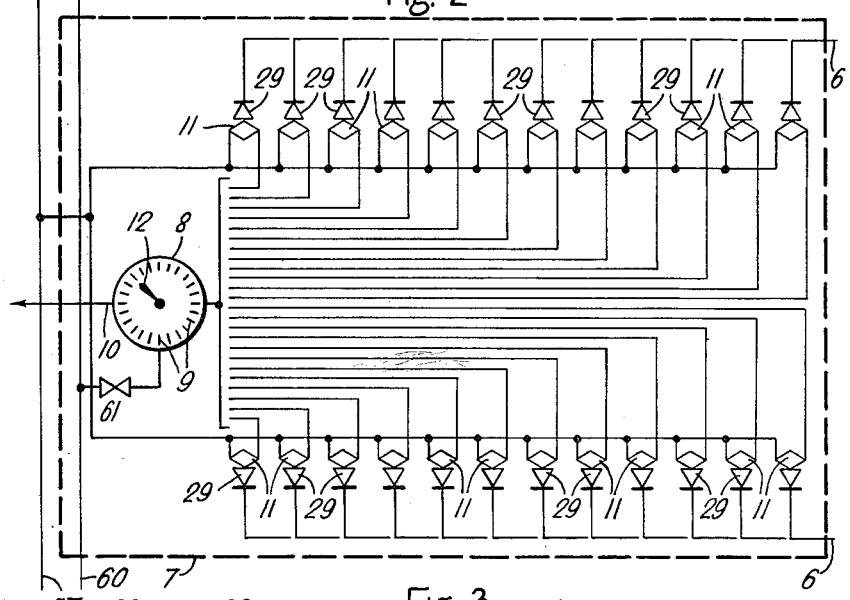
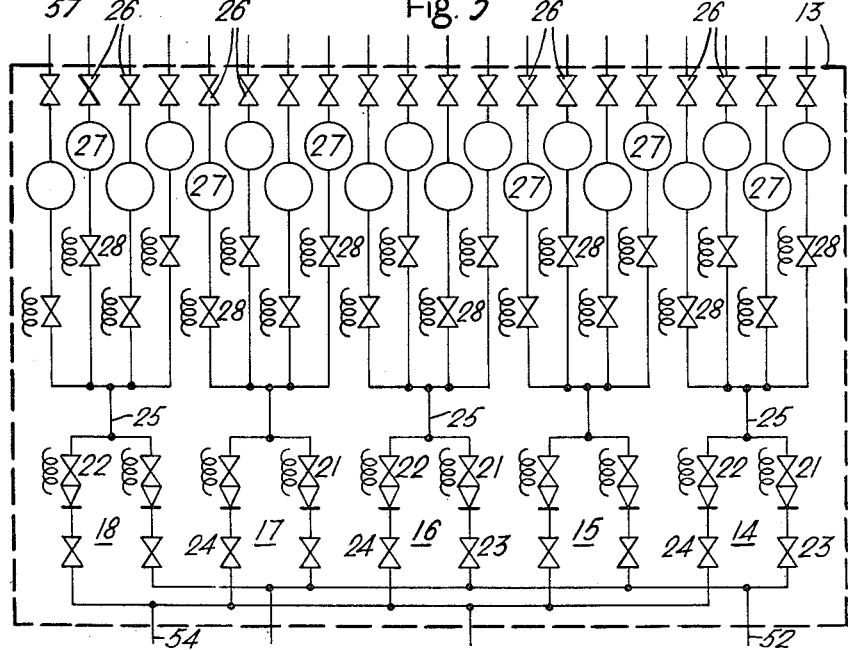
INVENTOR
DAVID JOHN GIBBONS
BY
ATTORNEYS 3,088,899
NUCLEAR REACTOR BURST CARTRIDGE
DETECTION
David John Gibbons, Orpington, Kent, England, assignor to The General Electric Company Limited, London, England
Filed Sept. 4, 1959, Ser. No. 838,186
Claims priority, application Great Britain Sept. 9, 1958
6 Claims. (Cl. 204—193.2)

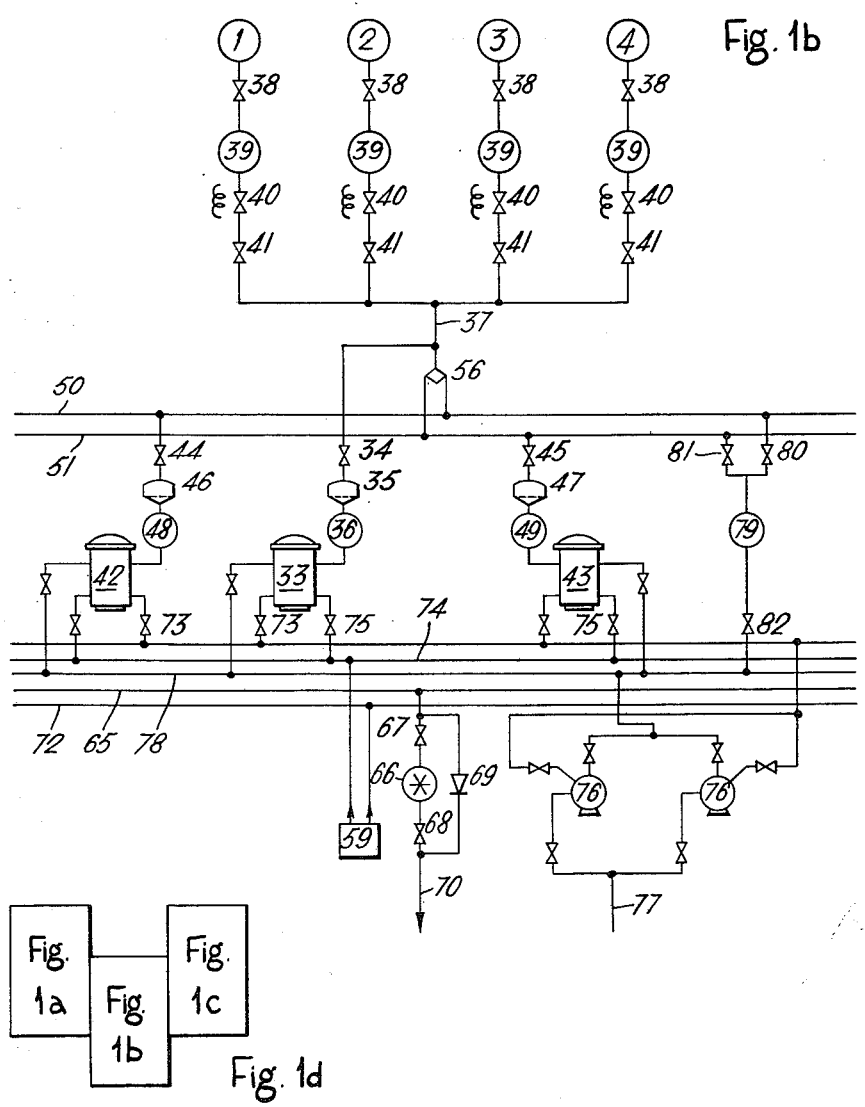

This invention relates to auxiliary equipment for nuclear reactors and particularly to burst cartridge detection equipment for nuclear reactors of the fluid cooled type in which samples of cooling fluid are drawn from each of a plurality of fuel element channels of a reactor and monitored. In a conventional burst cartridge detection system for say a gas cooled reactor of the Calder Hall type, samples of gas are drawn from each fuel element channel in turn and monitored for second decay products in a precipitator. The channels are normally sampled in groups, usually of four, to reduce the time taken for a complete reactor scan even though this means some loss in sensitivity.

Experience with the Calder Hall type of nuclear reactor has shown that fuel elements fail in two ways; one is a slow failure which takes place over several hours and the other is a rapid failure in a matter of minutes. An object of the present invention is the provision of equipment particularly adapted to detect these two types of failure to the greatest economic advantage.

According to the present invention, burst cartridge detection equipment in or for a nuclear reactor of the fluid cooled type in which samples of cooling fluid are arranged to be drawn from each of a plurality of fuel element channels of the reactor and monitored, comprises first monitoring means to monitor a selected group of said channels at one sensitivity, second monitoring means simultaneously to monitor the remainder of said channels at another sensitivity lower than the first, and sequence means to cause the first monitoring means sequentially to monitor all of said channels in groups while the remainder are being monitored by the second monitoring means.

Where a reactor is gas cooled, monitoring of gas for second decay products may be carried out in precipitators of known form and since the reactor is, as it were, scanned at two rates and at two sensitivities, there will be what may be termed a fine scanning precipitator and a coarse scanning precipitator, the fine scanning precipitator being designed to detect slow failures and the coarse scanning precipitator, rapid failures.

The sequential selection of the groups for fine scanning and the connection of the remainder for coarse scanning, may be effected by primary and secondary selector valves, and these valves will be mechanically and/or electrically inter-connected in such a way that the fine and coarse scannings are carried out together.

Figure 1A:
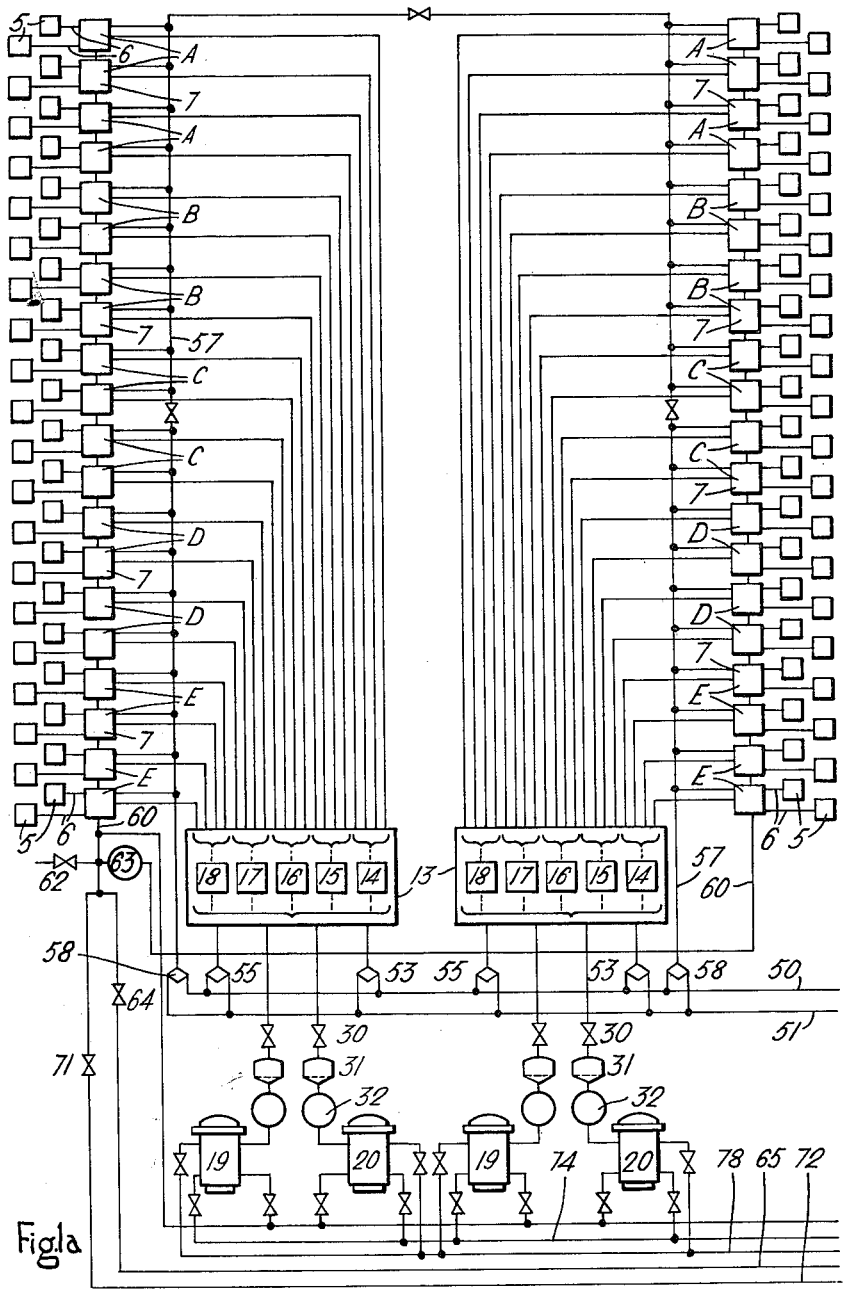
Figure 1C:
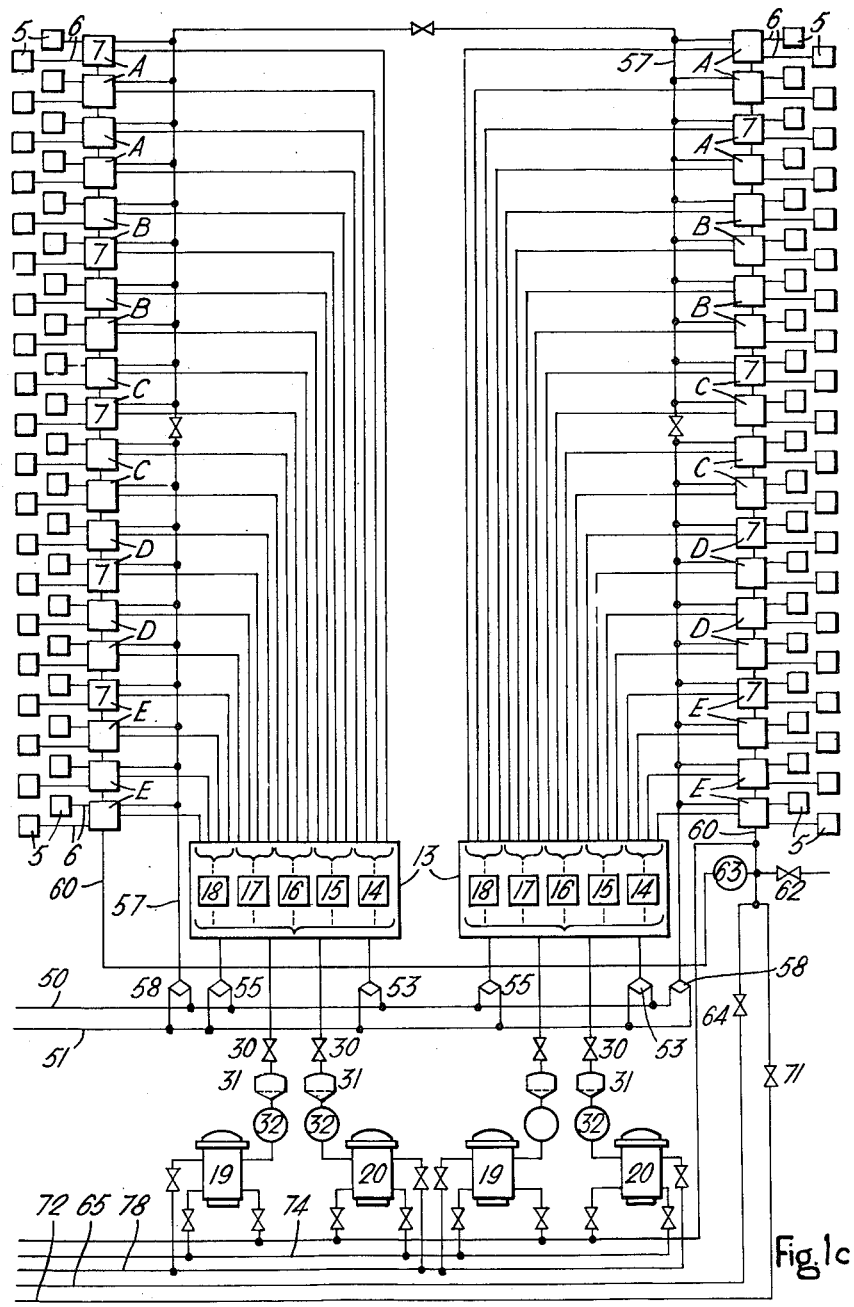

In order that the invention may be clearly understood, reference should now be made to the accompanying drawings, in which FIGURE 1 is a schematic diagram showing the layout of one example of equipment in accordance with the invention, and FIGURES 2 and 3 are detailed diagrams illustrating the items shown in block form in FIGURE 1 and referred to as the primary selector valve unit and the secondary selector valve unit respectively. For convenience, FIGURE 1 is split into separate FIGURES 1a, 1b and 1c and there are to be associated as shown by FIGURE 1d.

The reactor with which the equipment is associated is not itself shown in the drawings, but is of the gas-cooled, graphite-moderated type having, say, 1920 channels in the reactor core for gas flow. The core is housed within a pressure vessel to which the gas is conducted and from which it is extracted, by way of four main gas ducts denoted in FIGURE 1 by the reference numerals 1, 2, 3 and 4. The said channels are arranged for monitoring purposes in four sets of 480 channels each, and terminate in a known manner in guide pans 5, each guide pan being associated with twelve channels. There are thus forty guide pans associated with each set and the guide pans themselves are associated in pairs.

From each set of channels, gas sampling pipes 6 leading from the guide pans 5 take gas samples from the channels, one pipe for each channel, to twenty primary selector valve units 7, each valve unit being associated with a pair of guide pans and therefore with twenty four channels. In the drawings, for simplicity, each group of sampling pipes leading from a guide pan is indicated by a single line. Each primary selector valve unit 7, the arrangement of which is shown in detail in FIGURE 2, comprises essentially a selector valve 8 having twenty-four inlet ports 9 and one outlet port 10, the inlet ports being connected to the twenty four gas sampling pipes by way of three-way cocks 11 each including a spring-loaded ball valve 29. The twenty valve units 7 of each set are divided into five groups A, B, C, D and E. The valves 8 are provided each with a rotary selector arm 12 and these arms are arranged to be rotated in synchronism by electrical means, an arm permitting in any one position a sample gas flow for a period of thirty seconds. A complete cycle for a selector arm is thus twelve minutes.

The outlet from each set of twenty primary selector valve units is taken to a secondary selector valve unit 13, there being one unit 13 for each set. Each secondary selector valve unit comprises essentially five selector devices 14–18 connected respectively with the outlets of the groups A, B, C, D and E of the primary selector valve units, and these determine whether the inlet from any one set of primary selector valve units shall pass to a fine scanning precipitator, such as 19, or to a coarse scanning precipitator, such as 20. As may be seen from FIGURE 3, each selector device 14–18 comprises essential a pair of selectively operable solenoid operated non-return valves 21 and 22, these being each in series with a stop valve 23, 24 and controlling the flow of gas to the precipitators 19 and 20 respectively. Sample gas is led to the valves 21 and 22 by a common pipe 25 fed from four branches connected respectively with the outlets of the four primary selector valve units of the associated group, and each of said branches includes a stop valve 26, a flow alarm 27 for indicating a stoppage in gas flow, and a further solenoid operated valve 28, these being connected in series.

In operation of the equipment, the selection of fine or coarse setting of any selector device in a valve unit 13 by selective operation of the valves 21 and 22 is correlated to the movement of the arms 12 of the primary selector valve units 7 so that in any scanning period of twelve minutes, one group A, B, C, D or E of primary selector valve units will be connected to the associated fine scanning precipitator 19 and the remaining groups to the associated coarse scanning precipitator 20.

Thus, in the first period, each sub group A will receive fine scanning, each reading from a device 19 corresponding to the gas samples from 4 channels and during the same period, sub-groups B, C, D and E will receive coarse scanning, each reading from a device 20 corresponding to the gas samples from 16 channels. The time required to scan the whole 480 channels in any group under both fine and coarse scanning is 60 minutes, each channel having been monitored five times, four times on the coarse scan and one on the fine scan. This compared with conventional scanning where a channel is monitored only twice in an hour, is achieved without loss of the sensitivity required to detect a slowly developing burst cartridge in sufficient time for the fuel element discharge machine to remove the faulty element from the reactor before contamination of the coolant circuit occurs. If a fuel element failure is indicated in the coarse scan equipment, then the reactor power would be reduced as rapidly as possible until such time as the faulty element is removed when the power level would be restored.

It will be noted that there are four fine scanning precipitators 19 and four coarse scanning precipitators 20, a pair of precipitators 19 and 20 being associated with each unit 13, and each precipitator being connected thereto by a pipe including a stop valve 30, a filter 31, and a flow alarm 32.

A further precipitator 33 is provided for very coarse scanning of the main gas ducts 1, 2, 3 and 4. The inlet pipe to the precipitator 33 includes a stop valve 34, a filter 35 and a flow alarm 36, and is connected by way of a common pipe 37 to four sampling pipes connected to the main gas ducts. Each of these sampling pipes includes a stop valve 38, a flow alarm 39, a solenoid-operated valve 40 and a further stop-valve 41, and scanning of the ducts in turn is effected by selective operation of the valves 40.

Two spare and continuous monitoring precipitators 42 and 43 are provided, these being each fed through a stop valve 44 or 45, a filter 46 or 47, and a flow alarm 48 or 49 from two by-pass lines 50 and 51 respectively. In order that either or both of these precipitators may be used as a stand-by in the event that one or two of the other precipitators becomes faulty, each of the components normally connected with a fine scanning precipitator 19, a coarse scanning precipitator 20, or the duct scanning precipitator 33 is arranged to be connected with one or other of the lines 50 and 51 by way of a three-way cock. Thus, in each secondary selector valve unit 13, the valves 21 of the selector devices 14-18 are taken to a common line 52 which in turn is connected to the lines 50 and 51 by way of a three-way cock 53; similarly the valves 22 are taken to a common line 54 which in turn is connected with the lines 50 and 51 by way of a three-way cock 55. Gas samples obtained from the main gas ducts 1, 2, 3, and 4 can be diverted to either of the lines 50 and 51 by means of a three-way cock 56.

For continuous monitoring of the gas in any channel by means of the additional precipitators 42 and 43, a gas sample from that channel is arranged to by-pass the valve 8 by appropriate setting of the cock 11 connected to the sampling pipe 6 taken from that channel. This sample is taken directly to a continuous monitoring line 57, there being one such line for each set of primary selector valve units, and these lines are connected to the lines 50 and 51 by way of three-way cocks 58.

Each set of primary selector valve units 7 has an associated purging facility. This is arranged by evacuating the associated pipework and filling it with clean carbon dioxide obtained from a supply 59. A purge-line such as 60 is associated with each set of units 7 and the valves 8 are connected with the associated purge-line by stop valves 61. The four purge-lines 60 are connected in pairs and with each pair is an evacuating facility through valve 64, and an air vent 62 and a pressure gage 63. Evacuation of the purge lines is effected through valves 64 in a vacuum line 65 which is connected to a rotary vacuum pump 66. Stop valves 67 and 68 are provided for the pump and a non-return pressure relief valve 69 is connected across it. The exhaust gas from the pump is taken to a stack (not shown) by way of an exhaust line 70. Clean carbon dioxide is admitted to the purge lines 60 by way of valves 71 in a gas line 72, this line being supplied directly from the supply 59.

In a similar manner the precipitators 19, 20, 33, 42 and 43 have a purging facility, the precipitators being evacuated by way of valves 73, and carbon dioxide from a gas supply line 74 being admitted by way of valves 75. In order to maintain a steady gas flow through the equipment during scanning, there are provided two gas circulators 76, connected in parallel, these being connected with the main gas circuit by a line 77 and drawing gas through a common return line 78. For checking the quantity of gas flow through the equipment, a flow meter 79 is connected between the return line 78 and the lines 50 and 51, the latter being connected with the flow meter by way of stop valves 80, 81 and 82.

I claim:

1. In a nuclear reactor of the fluid cooled type in which samples of cooling fluid are drawn from each of a plurality of fuel element channels of the reactor and monitored for the presence of radioactive products, that improvement constituting a burst cartridge detection equipment comprising: first monitoring means for monitoring a selected group of said channels at one sensitivity, second monitoring means for monitoring the remainder of said channels at a sensitivity lower than the first sensitivity, and sequentially operated selector means for monitoring all said channels sequentially in groups with said first monitoring means while the remainder of the channels are being monitored by said second monitoring means.

2. In a nuclear reactor of the fluid cooled type including a plurality of sets of fuel element channels, and in which samples of cooling fluid are drawn from each of said channels and monitored for the presence of radioactive products, that improvement constituting a burst cartridge detection equipment comprising: a plurality of first monitoring means for monitoring a selected group of channels in each said set at one sensitivity, a plurality of second monitoring means for monitoring the remainder of the channels in each said set at a sensitivity lower than the first sensitivity, and sequentially operated selector means for monitoring all the channels in each said set sequentially in groups with said first monitoring means while the remainder of the channels are being monitored by said second monitoring means.

3. In a gas-cooled nuclear reactor including fuel element channels adapted for the throughflow of cooling gas, and in which gas samples are drawn from each of a plurality of said channels and monitored for the presence of radioactive products, that improvement constitutes a burst cartridge detection equipment comprising: first monitoring means for monitoring a selected group of said channels at one sensitivity, said monitoring means comprising a first precipitator for detecting second decay products; second monitoring means for monitoring the remainder of said channels at a sensitivity lower than the first sensitivity, said second monitoring means comprising a second precipitator for detecting second decay products; a plurality of first selector valve units each having a plurality of inlets and one outlet; gas sampling pipes connecting each said inlet with one said fuel element channel, said channels thereby being associated in groups and the channels of each group being connected by said sampling pipes to the inlets of a common selector valve unit; a plurality of second selector valve units each having one inlet and two outlets, the inlet of each said second selector valve unit being connected to the outlet of a respective said first selector valve unit, and said first and second monitoring means being connected respectively to the two outlets of each said second valve unit; each first selector valve unit having first selector means for selecting in sequence the gas sampling pipes connected thereto; each second selector valve unit having second selector means for selecting in sequence said first and second monitoring means; and means for correlating the operation of said first and second selector means for causing said first monitoring means to monitor all said channels sequentially in groups while the remainder are being monitored by said second monitoring means.

4. In a gas-cooled nuclear reactor including fuel element channels adapted for the throughflow of cooling gas, and in which gas samples are drawn from each of a plurality of said channels and monitored for the presence of radioactive products, an improved burst cartridge detection equipment as set forth in claim 3, wherein each said second selector valve unit comprises a pair of selectively operable solenoid-operated non-return valves, said valves being connected respectively with said first and second monitoring means, the selected gas samples being thereby passed to one or the other of said monitoring means in accordance with the selective operation of one or the other of said valves.

5. In a gas-cooled nuclear reactor including a plurality of sets of fuel element channels adapted for the throughflow of cooling gas, and in which gas samples are drawn from each of a plurality of said channels and monitored for the presence of radioactive products, an improved burst cartridge detection equipment comprising: a plurality of first monitoring means for monitoring a selected group of channels in each set at one sensitivity, each said monitoring means comprising a first precipitator for detecting second decay products; a plurality of second monitoring means for monitoring the remainder of said channels in each set at a sensitivity lower than the first, each said second monitoring means comprising a second precipitator for detecting second decay products; a plurality of first selector valve units each having a plurality of inlets and one outlet; gas sampling pipes connecting each said inlet with one said fuel element channel, the channels in each set being thereby associated in groups and the channels of each group being connected by said sampling pipes to the inlets of a common selector valve unit; a plurality of second selector valve units each having one inlet and two outlets, the inlet of each said second selector valve unit being connected to the outlet of a respective said first selector valve unit, and the outlets of each said second selector valve unit being connected respectively to a pair of said monitoring means comprising a said first precipitator and a said second precipitator; each first selector valve unit having first selector means for selecting in sequence the gas sampling pipes connected thereto; each second selector valve unit having second selector means for selecting in sequence said first and second precipitators connected thereto; and means for correlating the operation of said first and second selector means for causing said first monitoring means to monitor all the channels in each said set sequentially in groups while the remainder are being monitored by said second monitoring means.

6. In a nuclear reactor of the fluid cooled type including fuel element channels adapted for the throughflow of cooling fluid and main ducts for conveying cooling fluid to and from said channels, and in which samples of cooling fluid are drawn from each of a plurality of fuel element channels and monitored for the presence of radioactive products, an improved burst cartridge detection equipment comprising: first monitoring means for monitoring a selected group of said channels at one sensitivity, second monitoring means for monitoring the remainder of said channels at a sensitivity lower than the first, third monitoring means for monitoring said main ducts, first sequentially operated selector means for causing said first monitoring means to monitor all said channels sequentially in groups while the remainder are being monitored by said second monitoring means, and second sequentially operated selector means for causing said third monitoring means to monitor said main ducts in sequence.

References Cited in the file of this patent

UNITED STATES PATENTS 2,823,179     Snell et al. _____ Feb. 11, 1958

FOREIGN PATENTS 814,416     Great Britain _____ June 3, 1959

OTHER REFERENCES

Nucleonics, vol. 11 (December 1956), pages S20 and S21.